Dec. 9, 1958     A. J. HUCK     2,863,377
POP-UP TOASTER WITH AUTOMATIC LOWERING AND
RAISING OF BREAD CARRIER
Filed Oct. 4, 1954     3 Sheets-Sheet 1
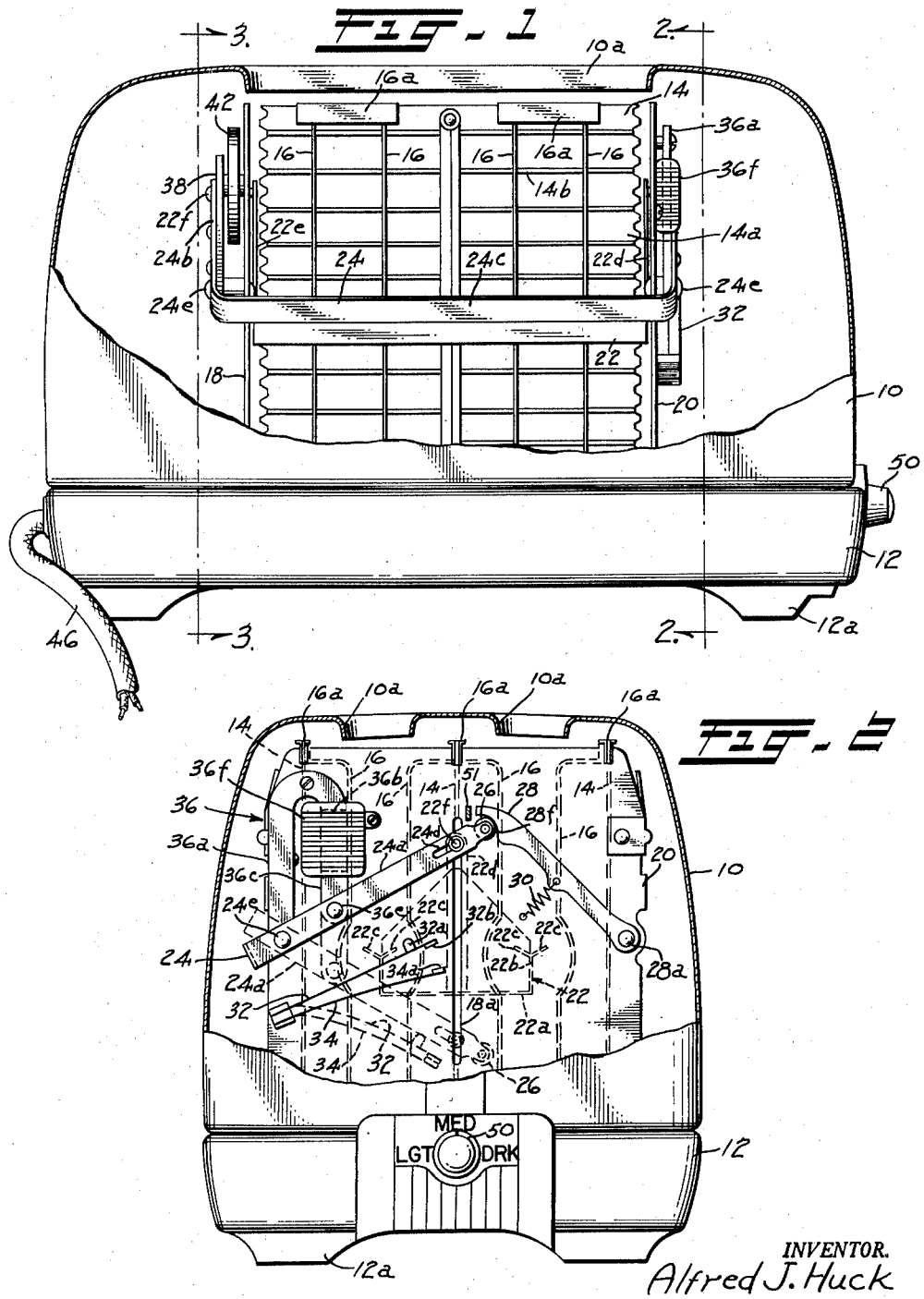
INVENTOR.
Alfred J. Huck
BY
Bair, Freeman & Molinare
Att'ys

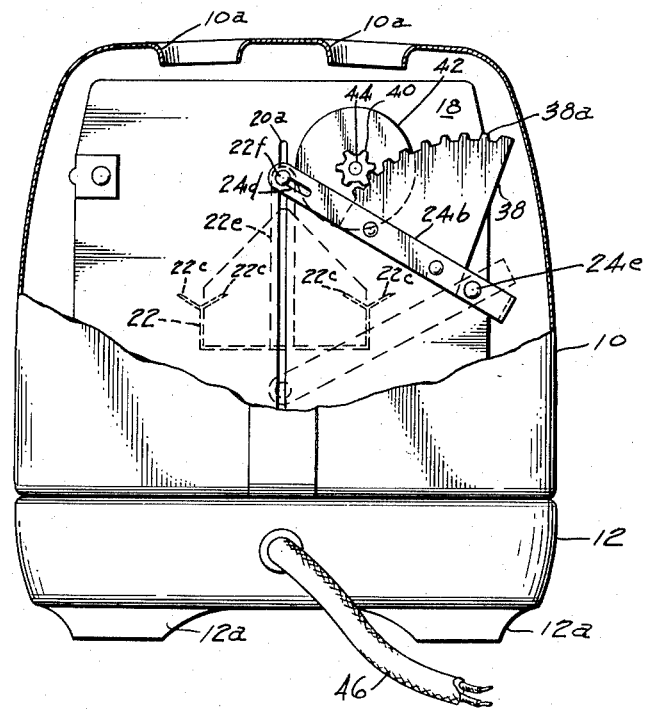
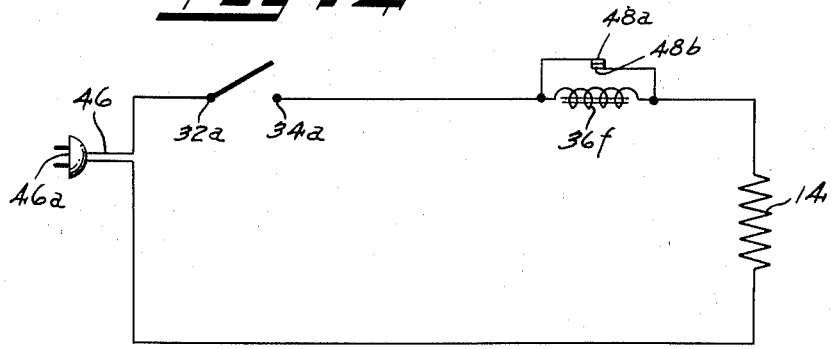

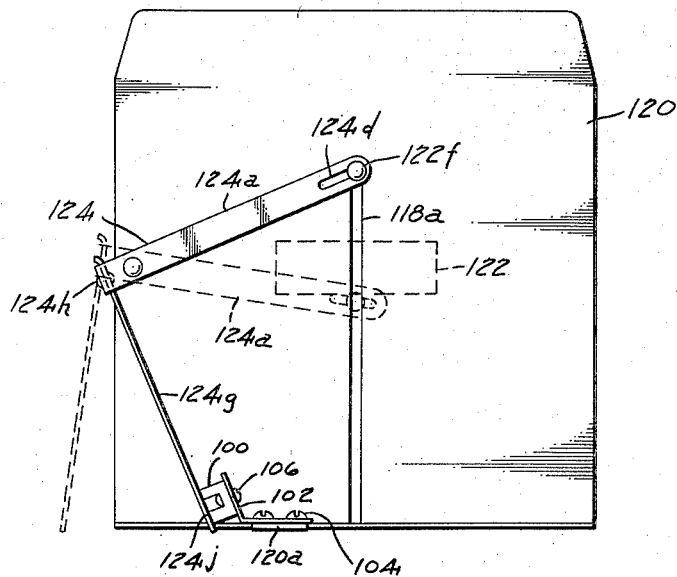
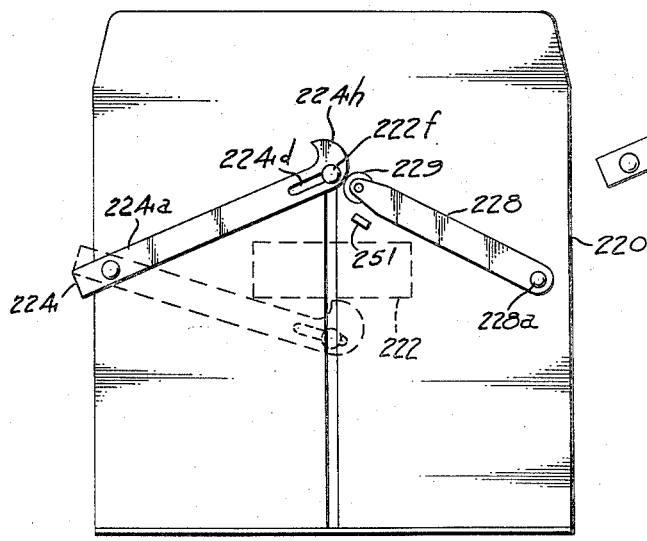
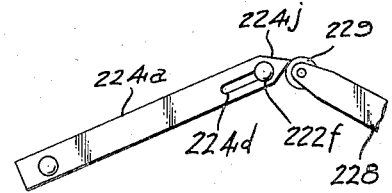

United States Patent Office 2,863,377
Patented Dec. 9, 1958

2,863,377

POP-UP TOASTER WITH AUTOMATIC LOWERING AND RAISING OF BREAD CARRIER

Alfred J. Huck, St. Louis, Mo., assignor to Knapp-Monarch Company, St. Louis, Mo., a corporation of Delaware Application October 4, 1954, Serial No. 460,052

10 Claims. (Cl. 99—329)

The present invention relates to an automatic toaster wherein fully automatic bread toasting operations are initiated by placing the bread in toasting position and exerting slight downward pressure thereon.

In the so-called pop-up type toaster, a vertically reciprocable bread carrier is provided and the toasting elements are energized through suitable normally open switches which are closed by manual movement of the bread carrier to down position. This movement winds up a carrier lifting spring and engages latch mechanism to hold the bread carrier in down position. Thermostatic means is provided to release the latch to permit the springs to snap the bread carrier to up position when the toasting operation is completed. Toasters of this type—while they have found wide acceptance because of their low cost, reliability and convenience—are somewhat cumbersome to operate since two operating movements are required; namely, placing the bread in position and depressing the bread carriage to toasting position. The latter movement requires a considerable force since it is necessary to overcome the spring force.

In accordance with the present invention, a toaster is provided in which the bread toasting operation is initiated by placing the bread in position and then pushing down with a slight force to overcome the means provided to hold the carrier in up position. Thereafter, operation is fully automatic in that the bread carrier—and the bread—descend to toasting position; toasting takes place; and the bread carrier—and the bread—rise to bread discharge position and there remain until the bread is removed.

It is accordingly a general object of the invention to provide an improved, fully automatic toaster.

A more specific object of the present invention is to provide an improved, fully automatic toaster in which the toasting cycle is initiated by placing the bread in position and pushing down with a slight force.

Another object of the present invention is to provide an improved, automatic toaster wherein the bread carrier is releasably held in up position where it remains until manually pushed down.

Still another object of the present invention is to provide an improved toaster of the foregoing type which utilizes simple mechanical elements to sustain the bread carrier in up position.

Yet another object of the present invention is to provide an improved automatic bread toaster in which automatically energized power means lifts the bread carrier upon completion of toasting operations to restore the carrier to up position, in which position the entire toaster is de-energized.

Further, it is an object of the present invention to provide an improved, fully automatic toaster of simple, inexpensive, and yet reliable construction and embodying features of construction, combination and arrangement rendering particularly suitable for domestic use.

The novel features which I believe to be characteristic of my invention are set forth with particularity in the appended claims. My invention itself, however, both as to its organization and method of operation, together with further objects and advantages thereof, will best be understood by reference to the following description taken in conjunction with the accompanying drawings, in which:

Figure 1 is a side elevational view, with parts broken away, of a toaster embodying the present invention;

Figure 2 is an end elevational view of the toaster of Figure 1 with parts broken away along cross-section 2—2, Figure 1;

Figure 3 is an end elevational view of the toaster of Figure 1 taken from the end opposite that of Figure 2 and with parts broken away along axis 3—3, Figure 1;

Figure 4 is a schematic circuit diagram of the circuit of the toaster of Figures 1–3;

Figure 5 is a fragmentary view taken along axis 2—2, Figure 1, showing an alternative embodiment of the present invention;

Figure 6 is a view like Figure 5 showing still another alternative embodiment; and Figure 7 is a view similar to Figure 6, but showing still another form of the inter-engaging arms to support the bread carrier.

Referring now to Figures 1–3, the toaster consists of a housing 10 having a base portion 12 with feet 12a. The latter may, for example, be of a plastic material and the housing 10 may be of sheet steel with a suitable chrome or similar finish. The housing 10 is of generally rectangular conformation, as shown in the figures, and has a pair of bread-receiving openings 10a where the margin of the housing 10 is bent downwardly to form an attractive guide flange.

As shown in Figures 1 and 2, the housing 10 has a series of heater elements indicated at 14. These elements consist of sheets 14a of mica or similar heat resisting insulating material upon which are wound the Nichrome ribbons 14b to define resistance heating elements. As shown by the dotted lines of Figure 2, there is a central element 14 located between the bread openings 10a and an outboard element 14 on the outboard side of each of these openings. In addition, a wire grid formed by the vertical wires 16, Figures 1 and 2, extends across the face of each of the heaters 14 to guide bread inserted in the bread openings 10a and prevent direct contact of the same with the heater element. As shown in Figure 1, the vertical wires 16 are sustained in position from the top edge of the respective heater elements by the metal clamps 16a.

At the opposite end of the heater elements 14—and consequently, the opposite ends of the bread openings 10a—there are provided a pair of vertical support plates 18 and 20, Figure 1, respectively. As shown in the figures, these extend crosswise of the housing 10 and each has a longitudinal central slot 18a and 20a, respectively, which serves as a guide slot for the vertically reciprocable toast-receiving carriage indicated at 22. This carriage has a horizontal cross piece 22a, Figure 2, which terminates in a pair of vertical pieces 22b, each centrally disposed beneath one of the bread openings 10a. Each vertical piece 22b terminates in a V-shaped portion 22c which defines a broad support area to receive slices of bread deposited through the bread-receiving openings 10a. In addition, the bread carrier 22 has an upstanding arm on each end, one arm being indicated at 22d, Figure 1, and the other arm being indicated at 22e, Figure 1. The arm 22d is further shown by the dashed lines in Figure 2, and the arm 22e is shown in the dashed lines in Figure 3.

Each of the arms 22d and 22e receives a pin 22f, Figures 2 and 3, which is likewise received by the U-shaped operating arm 24. It will be noted that the operating arm 24 has side portions 24a and 24b and a base or central portion 24c, the latter extending over the edge of the toaster element. The pins 22f are received by elongated openings 24d in each of the side arm portions of the U-shaped arm 24. The arm 24 is pivoted at each of its side portions to the respective support plates 18 and 20. One such pivot is indicated at 24'e, Figure 3, and the other is indicated at 24e, Figure 2. These pivots are in alignment to sustain the arm 24 for rotation about an axis parallel to the orientation of the bread carrier 22. Thus, as the arm 24 is rocked about the pivots 24e, the pins 22f move up and down in unison and the bread carrier 22 is likewise moved up and down, the latter being held in a horizontal position by the arm 24.

As shown in Figure 2, the right-hand side portion 24a of the arm 24 receives a roller 26 at its outboard end. This roller is cooperatively engaged by the spring biased cam arm 28 which is pivoted to the support plate 20 at 28a and is pulled in the counterclockwise direction, as seen in Figure 2, by the tension spring 30. The arm 28 has a concave cam face 28f which receives the roller 26, as shown in Figure 2, thereby sustaining the arm 24 in elevated position. However, when the arm 24 is swung downwardly, as hereinafter described, the roller 26 rolls out of the concave cam face 28b and the arm 24 then is free to drop without hindrance by the cam arm 28.

A pressure operated flexible switch arm 32 is positioned for engagement by the arm 24a, as shown in Figure 2. Specifically, the switch arm 32 has an upstanding insulating nub which protrudes upwardly and engages the arm 24a. As the arm 24a descends after engagement with the nub 32a, the arm 32 is flexed and comes into contact with the lower switch arm 34. Arm 32 has a contact 32b and arm 34 has a contact 34a, which contacts are thus brought into engagement to establish the heating circuit, as hereinafter described in detail. Further descending motion of the arm 24a flexes the arms 32 and 34 to the flexed position shown in the dotted lines of Figure 2, at which time the arm 24a likewise has the position shown in the dotted lines.

A lifting solenoid unit, indicated generally at 36, is provided to lift the bread carrier—and bread—from the lowered position when the arm 24a is depressed, as shown by the dotted lines of Figure 2. This solenoid consists of an elongated, inverted J-shaped magnetic core 36a which is rigidly mounted on the support plate 20. This core terminates at 36b and is cooperatively associated with the movable core 36c which is pivoted at 36e to arm 24a and—when arm 24a is in up position, as shown in Figure 2—is adjacent portion 36b of the core member 36. An operating solenoid 36f surrounds the core 36c when the latter is in up position, as shown. When the bread carrier is in the lowered position where the arm 24a has the dotted line position of Figure 2, energization of solenoid 36f produces pulling forces on the movable core 36c to draw that core upwardly and thereby lift arm 24a and the bread to the up position shown in Figure 2.

As shown in Figure 3, the arm 24b receives a toothed sector plate 38 having gear teeth 38a at its outboard arcuate face. The teeth 38a are in mesh with the teeth of pinion 40 which is mounted integral with the flywheel 42, both of these being sustained on the support plate 18 by the support pin or shaft 44. The purpose of these parts is to impart additional inertia to the bread carrier. Since the flywheel 42 rotates at a very high velocity in relation to the speed of movement of the bread carrier 22, the effect of this mechanism is to cause the bread carrier 22 to ascend and descend as if it had a very large inertia, that is, in a slow deliberate manner.

Figure 4 shows the circuit diagram of the mechanism. The appliance cord 46, Figures 1 and 4, is provided with an appliance plug 46a to be received in the usual household electric socket. One of the conductors from plug 46a extends to the contact 32b of flexible switch blade 32 and thence to the contact 34a of the flexible switch blade 34. From this point, a series circuit is provided which extends through the normally closed thermostatic switch contacts 48a and 48b to the heater 14 and thence, back to the opposite conductor of the appliance plug 46a. The thermostatic switch contacts 48a and 48b are opened when the heater 14 brings the bread to toasted condition.

In operation, the toaster shown in Figures 1–4 is actuated by placing bread on one or both of the bread carriers and then pressing the bread carrier down by a slight force exerted through the bread itself. This force overcomes the holding action of cam face 28b of cam arm 28 and frees the arm 24a of cam arm 28. Arm 24—and hence the bread carrier 22—thereupon descends under the weight of the bread carrier, as well as the bread, to engage the nub 32a of the flexible switch blade 32. The blade 32 is then flexed under the weight of the bread and bread carrier until the position shown in the dotted lines of Figure 2 is reached.

As soon as the switch arm 32 is flexed to engagement with the switch arm 34, the circuit of Figure 4 is established and the heater elements 14 are energized through the contacts 32b and 34a and the contacts 48a and 48b. The contacts 48a and 48b are positioned to partake of the temperature of the bread so that when the bread has reached a toasted condition, these contacts separate. When this event takes place, the circuit is established to solenoid 36f through contacts 32b and 34a and through the heater elements 14. However, since the latter have a relatively low resistance, there is a substantial voltage applied across the solenoid 36f resulting in a substantial current flow therethrough thus creating a substantial upward pull on the arm 36c, Figure 2. This pull overcomes the weight of the bread and bread carrier and lifts the arm 24a to the position shown in the full lines of Figure 2 where the roller 26 is nested in the cam face 28b.

It will be observed that when the arm 24a reaches an intermediate position, the contacts 32b and 34a break circuit. However, because of the velocity of movement of the arm 24a at this moment, there is a sufficient momentum to carry the arm up to the solid position of Figure 2.

The effect of the flywheel 42 is to increase the momentum of the moving parts as the arm 24a rises. This aids in assuring that the arm does in fact reach the dotted position of Figure 2. Moreover, the flywheel 42 restrains the descending movement of the bread carrier to give a pleasant deliberate mechanical motion to the bread at all times.

It will be observed from the foregoing that in the toaster of the present invention, the bread is held in up position by the releasable cam elements and that all that is necessary to initiate operation of the toaster is to depress the bread itself slightly from the up position, at which time the full toasting cycle is carried out in a completely automatic manner. Moreover, it will be observed that recycling of the toaster is prevented by the holding action of the cam arm 28 so that once the cycle is executed, no further toasting action takes place until the operator indicates a desire for such action by depressing the bread.

The knob 50, Figures 1 and 2, is provided to vary the temperature at which the thermostatic switch contacts 48a and 48b, Figure 4, open circuit. This knob accordingly provides a control of the degree of toasting which is provided.

A pin or a stop pin 51, Figure 2, protrudes from the outboard side of the support plate 20 in position to be engaged by the spring biased cam arm 28 and hold that cam arm against further movement in response to tension of spring 30. Thus, as the bread carrier descends and the arm 24a swings to the dotted line position of Figure 2, the arm 28 is held in a position only slightly different from that shown in Figure 2 and is thus conditioned to receive the roller 26 as the arm 24a again swings upwardly in response to momentary energization of the solenoid 36f.

Figure 5 shows a modified form of the present invention. Parts corresponding to parts shown in Figure 2 are indicated with like reference numerals with the numeral 100 added. As shown, the arm 124 has portion 124a which extends over the slot 118a and is pinned to the bread carrier 122 by the pin 122f. This pin rides in an elongated slot 124d, Figure 5, so that as the arm 124a swings downwardly in clockwise direction to the position such as the dotted line position of Figure 5, the bread carrier 122 likewise descends.

The arm 124, Figure 5, has a depending arm 124g which is held in place on arm 124 by the rivet 124h. As shown, the outboard end 124j of the arm 124g is in mating relationship with the fixed magnet 100. The latter is held in place on the support plate 120 by the bracket 102 which in turn is supported by the ear 120a. It will be noted that the bracket 102 is attached to the ear 120a by screws 104 and that the magnet 100 is attached to the bracket 102 by the rivet 106.

In operation, the toaster of Figure 5 is provided with a suitable lift magnet, such as that shown in Figure 2, and suitable switch means is provided to energize the heater when the carrier 122 is in lowered position. When it is desired to start toasting operation, the bread is placed on the carrier 122 and given a sufficient downward push to overcome the force exerted by magnet 100 on the magnetic end portion 124j of the arm 124g. Since the magnetic force quickly diminishes to virtually zero after the arm 124j separates from magnet 100, the carrier 122 then descends to the lowered position where the heating elements are energized and toasting takes place. Upon completion of the toasting operation, the lift magnet (not shown) is energized by suitable switch means (not shown), at which time the arm 124a is lifted and the bread carrier 122 is likewise raised. The lift magnet has a sufficient power and the moving parts have sufficient inertia so that the bread carrier 122 is brought to the full lifted position shown in Figure 5, where the arm 124g swings to engage portion 124j against magnet 100 and—by reason of the magnetic forces—sustains the bread carrier in the lifted position.

Figure 6 shows still another modification of the toaster construction. In this figure, parts corresponding to those shown in Figures 1 and 2 are shown with like reference numerals with the numeral 200 added. In this structure, an arm 224 has a portion 224a with an arcuate head 224h. A pin 222f is received in this head portion and is attached to the bread carrier 222. The rivet rides in the elongated slot 224d so that when the arm 224a swings downwardly in the clockwise direction the bread carrier 222 descends. Arm 228 is swingably mounted on the support plate 220 for rotation about the axis of the mounting pin 228a. This arm has a roller 229 located at its outboard end in engagement with the arcuate face 224h of arm 224a. Stop pin 251 is provided to limit the counterclockwise rotation of the arm 228.

In the structure of Figure 6, a lift magnet, such as that shown in Figure 2, is provided, together with switch elements to energize the heaters when the bread carrier 222 is in lowered or toasting position.

In operation, bread is placed on the bread carrier 222, which carrier is held in the up position by the action of arm 228 and the arcuate cam face 224h of arm 224a. When a slight manual downward push is exerted on the bread carrier, however, the cam face 224h moves down over roller 229 to swing the arm 228 in a clockwise direction and ultimately release arm 224a from the holding action of arm 228. The bread carrier 222 descends and toasting operation begins. Upon completion of the toasting operations the lift solenoid (not shown) is energized to raise arm 224a and hence the bread carrier 222. The power of the lift solenoid, together with the inertia of the moving parts, is sufficient to carry the arm 224a to the position of the solid lines of Figure 6. In reaching this position, the roller 229 rolls up over the face 224h of arm 224a so that arm 224h swings underneath arm 224a as shown in Figure 6. This effects the holding operation which sustains the bread carrier 222—and the bread—in the lifted position.

Figure 7 is a fragmentary view of the arm 224a showing an end facing 224j which is pointed rather than arcuate. This gives a cam action which yieldably holds the bread carrier in lifted position in the same manner as above described, with reference to Figure 6.

While I have shown and described a specific embodiment of the present invention, it will, of course, be understood that numerous modifications and alternative constructions may be made without departing from the true spirit and scope thereof. I therefore intend by the appended claims to cover all such modifications and alternative constructions falling within their true spirit and scope.

What I claim as new and desire to secure by Letters Patent of the United States is:

1. In an automatic toaster of the type having a housing, a vertically reciprocable bread carrier therein, and bread toasting means therein, the improvement comprising: an arm pivoted at one end to the housing and also pivoted to the bread carrier to swing as the bread carrier is raised and lowered, the other end of the arm being spaced from the points of pivot; a cam having a concave face to receive said other end of the arm when the carriage is in up position, the cam being biased to a seating engagement with the arm; a lift means including a force producing means operable when energized momentarily to initiate upward accelerated movement of the arm and inertia means to maintain subsequent upward non-accelerated movement of said arm to cam engaging position, thus lifting the carrier and sustaining the same in up position; normally open switch elements connected in circuit with the bread toasting means; means to close said last elements when the bread carrier is in lowered position to initiate a toasting operation; and a thermostatic element operable to energize momentarily the force producing means of said lift means and thereby effect raising of the bread carrier upon completion of the toasting operation.

2. In an automatic toaster of the type having a housing, a vertically reciprocable bread carrier therein, and bread toasting means therein, the improvement comprising: an arm pivoted at one end to the housing and also pivoted to the bread carrier to swing as the bread carrier is raised and lowered, the other end of the arm being spaced from the points of pivot; a cam having a concave face to receive said other end of the arm when the carriage is in up position, the cam being biased to a seating engagement with the arm; lift means including a force producing means operable when energized momentarily to initiate upward accelerated movement of the arm and inertia means to maintain subsequent upward non-accelerated movement of said arm to cam engaging position, thus lifting the carrier and sustaining the same in up position; normally open switch elements connected in circuit with the bread toasting means; means to close said switch elements when the bread carrier is in lowered position to initiate a toasting operation; a thermostatic element operable to energize momentarily the force producing means of said lift means and thereby effect raising of the bread carrier upon completion of the toasting operation; and said inertia means including, a flywheel connected to the bread carrier to rotate rapidly and impart deliberate movement thereto.

3. In an automatic toaster of the type having a housing, a vertically reciprocable bread carrier, and bread toasting means, the improvement comprising: an arm pivoted to the housing and to the bread carrier to swing as the bread carrier is raised and lowered, the arm having an end spaced from the points of pivot; an element operable to receive said end of the arm when the carriage is in up position, said element being movable to a seating engagement with the arm to sustain the same in up position; accelerating lift means operable when energized momentarily to initiate raising the arm toward engaging relationship with said element, where the carrier is sustained in up position, said accelerating lift means being de-energized before said carrier moves into the up position; means including the inertia of the carrier, after the lift means has been deenergized, to effect movement of the carrier upwardly until the carrier moves into said sustained lifted position; normally open switch elements connected in circuit with the bread toasting means; means to close said last elements when the bread carrier is in lowered position to initiate a toasting operation; and a thermostatic element operable to energize momentarily the lift means and thereby initiating raising the bread carrier upon completion of the toasting operation.

4. In an automatic toaster of the type having stationary structure, a movable bread carrier, and bread toasting means, the improvement comprising: arm means pivoted to the stationary structure and operatively connected to the movable bread carrier to swing as the bread carrier is raised and lowered, the arm means having a restrainable portion spaced from said connection between the carrier and arm means and from said pivot point; a restraining element operable to receive said restrainable portion of the arm means when the carrier is in up position, said restraining element being movable to an operative engagement with said restrainable portion of the arm means to sustain the same in up position; accelerating lift means operable when energized momentarily to initiate pivoting of the arm means toward engaging relationship with said restraining element, where the carrier is sustained in up position, said accelerating lift means being de-energized before said carrier moves into the up position; means including the inertia of the carrier, after the lift means has been de-energized, to effect movement of the carrier upwardly until the carrier moves into said sustained lifted position; normally open switch elements connected in circuit with the bread toasting means; means to close said last elements when the bread carrier is in lowered position to initiate a toasting operation; and a thermostatic element operable to energize momentarily the lift means and thereby initiate raising the bread carrier upon completion of the toasting operation.

5. In an automatic toaster of the type having stationary structure, a movable bread carrier, and bread toasting means, the improvement comprising: arm means pivoted to the stationary structure and operatively connected to the movable bread carrier to swing as the bread carrier is raised and lowered, the arm means having a restrainable portion spaced from said connection between the carrier and arm means and from said pivot point; a restraining element operable to receive said restraining portion of the arm means when the carriage is in up position, said restraining element and restrainable portion of the arm means being relatively movable to a position of operative engagement therebetween where the arm means and the bread carrier connected thereto are sustained in up position; accelerating lift means operable when energized momentarily to initiate pivoting of the arm means toward engaging relationship with said restraining element, where the carrier is sustained in up position, said accelerating lift means being de-energized before said carrier moves into the up position; means including the inertia of the carrier, after the lift means has been de-energized, to effect movement of the carrier upwardly until the carrier moves into said sustained lifted position; normally open switch elements connected in circuit with the bread toasting means; means to close said last elements when the bread carrier is in lowered position to initiate a toasting operation; and a thermostatic element operable to energize momentarily the lift means and thereby initiate raising the bread carrier upon completion of the toasting operation.

6. A device as set forth in claim 5 wherein the restrainable portion of said arm means and said restraining element with which said restrainable portion cooperates to sustain the bread carrier in up position constitute yieldably operable cam means which are separable under pressure exerted against the bread carrier through a bread slice positioned thereon, whereby after the cam means are separated, said carrier gravitates to its lowered, bread-toasting position.

7. A device as set forth in claim 5 wherein the restrainable portion of said arm means and said restraining element with which said restrainable portion cooperates to sustain the bread carrier in up position constitute yieldably operable magnetic elements which are separable under pressure exerted against the bread carrier through a bread slice positioned thereon, whereby after said cam means are separated, said carrier gravitates to its lowered, bread-toasting position.

8. A device as set forth in claim 5 wherein the restrainable portion of said arm means and said restraining element with which said restrainable portion cooperates to sustain the bread carrier in up position constitute yieldably operable cam means which includes a roller element and a cam edge engageable with the peripheral edge of said roller element, and said cam means being separable under pressure exerted against the bread carrier through a bread slice positioned thereon.

9. A device as set forth in claim 5 wherein the operative connection between the arm means and the movable bread carrier is a lost-motion type connection.

10. In an automatic toaster of the type having stationary structure, a movable bread carrier, and bread toasting means, the improvement comprising: arm means pivoted to the stationary structure and operatively connected to the movable bread carrier to swing as the bread carrier is raised and lowered, the arm means having a restrainable portion spaced from said connection between the carrier and arm means and from said pivot point; a restraining element operable to receive said restraining portion of the arm means when the carriage is in up position, said restraining element and restrainable portion of the arm means being relatively movable to a position of operative engagement therebetween where the arm means and the bread carrier connected thereto are sustained in up position; accelerating lift means operable when energized momentarily to initiate pivoting of the arm means toward engaging relationship with said restraining element, where the carrier is sustained in up position, said accelerating lift means being de-energized before said carrier moves into the up position; means including the inertia of the carrier, after the lift means has been de-energized, to effect movement of the carrier upwardly until the carrier moves into said sustained lifted position; normally open switch elements connected in circuit with the bread toasting means; means to close said last elements when the bread carrier is in lowered position to initiate a toasting operation; an toasting-cycle-terminating means operable to energize momentarily the lift means and thereby initiate raising the bread carrier upon completion of the toasting operation.

References Cited in the file of this patent

UNITED STATES PATENTS

| Re. 22,781 | Anderson | Aug. 20, 1946 |
|---|---|---|
| 2,099,210 | Ireland | Nov. 16, 1937 |
| 2,194,859 | Malmquist et al. | Mar. 26, 1940 |
| 2,347,611 | Purpura | Apr. 25, 1944 |
| 2,361,446 | Anderson | Oct. 31, 1944 |
| 2,389,434 | Huck | Nov. 20, 1945 |
| 2,515,866 | Fitzgerald | July 18, 1950 |
| 2,624,267 | Olson | Jan. 6, 1953 |
| 2,662,466 | Ireland | Dec. 15, 1953 |
| 2,693,142 | Ireland | Nov. 2, 1954 |
| 2,693,143 | Ireland | Nov. 2, 1954 |
| 2,734,448 | McCullough | Feb. 14, 1956 |